US008879659B1

(12) United States Patent
Olgaard

(10) Patent No.: US 8,879,659 B1
(45) Date of Patent: Nov. 4, 2014

(54) SYSTEM AND METHOD FOR TESTING MULTIPLE DATA PACKET SIGNAL TRANSCEIVERS

(71) Applicant: Litepoint Corporation, Sunnyvale, CA (US)

(72) Inventor: Christian Volf Olgaard, Saratoga, CA (US)

(73) Assignee: Litepoint Corporation, Sunnyvale, CA (US)

( * ) Notice: Subject to any disclaimer, the term of this patent is extended or adjusted under 35 U.S.C. 154(b) by 0 days.

(21) Appl. No.: 14/017,012

(22) Filed: Sep. 3, 2013

(51) Int. Cl.
*H04B 7/02* (2006.01)
*H04W 24/08* (2009.01)
*H04B 7/04* (2006.01)

(52) U.S. Cl.
CPC ............. *H04W 24/08* (2013.01); *H04B 7/0413* (2013.01)
USPC ......................................................... 375/267

(58) Field of Classification Search
CPC ........... H04L 1/06; H04L 1/244; H04L 1/243; H04B 7/0413; H04W 24/08
USPC ......................................................... 375/267
See application file for complete search history.

(56) References Cited

U.S. PATENT DOCUMENTS

| 8,086,925 | B2* | 12/2011 | Gass et al. ..................... 714/738 |
| 8,312,329 | B1* | 11/2012 | Yellapantula et al. ......... 714/704 |
| 2004/0085939 | A1* | 5/2004 | Wallace et al. ................ 370/335 |
| 2007/0070691 | A1* | 3/2007 | Walvis et al. ............. 365/185.03 |
| 2007/0070881 | A1* | 3/2007 | Olgaard et al. ............... 370/208 |
| 2007/0243826 | A1* | 10/2007 | Liu ............................. 455/67.11 |
| 2007/0280196 | A1* | 12/2007 | Olgaard et al. ............... 370/351 |
| 2008/0172588 | A1* | 7/2008 | Olgaard ........................ 714/742 |
| 2010/0123471 | A1* | 5/2010 | Olgaard et al. ............... 324/754 |
| 2011/0096821 | A1* | 4/2011 | Olgaard et al. ............... 375/224 |
| 2011/0124295 | A1* | 5/2011 | Mahjoubi Amine et al. .......................... 455/67.14 |
| 2012/0051224 | A1* | 3/2012 | Olgaard et al. ............... 370/241 |
| 2012/0121000 | A1* | 5/2012 | Olgaard et al. ............... 375/224 |
| 2012/0121001 | A1* | 5/2012 | Olgaard et al. ............... 375/224 |
| 2012/0269288 | A1* | 10/2012 | Olgaard et al. ............... 375/296 |

OTHER PUBLICATIONS

Devarakond, "DSP Driven Parallel EVM Testing of Embedded MIMO-OFDM RF Modules", 2012 18th International Mixed-Signals, Sensors and Systems Test Workshop (IMS3TW), May 14-16, 2012, pp. 40-45.*
U.S. Appl. No. 13/840,176, filed Mar. 15, 2013, "System and Method for Testing a Data Packet Signal Transceiver".
U.S. Appl. No. 13/841,019, filed Mar. 15, 2013, "System and Method for Testing a Data Packet Signal Transceiver".
U.S. Appl. No. 13/894,817, filed May 15, 2013, "System and Method for Testing a Radio Frequency Multiple-Input Multiple-Output Data Packet Transceiver While Forcing Fewer Data Streams".

* cited by examiner

*Primary Examiner* — Juan A Torres
(74) *Attorney, Agent, or Firm* — Vedder Price PC

(57) ABSTRACT

A system and method for using a N×N multiple input, multiple output (MIMO) data packet signal transceiver for testing multiple data packet signal transceivers. In accordance with one exemplary embodiment, a N×N MIMO access point can be used for simultaneous testing of multiple single input, single output (SISO) data packet signal transceivers. Selective data packet signal corruption (e.g., in the form of data packet signal attenuation), allows for individual testing of the transmit signals from respective ones of the data packet signal transceivers.

20 Claims, 4 Drawing Sheets

SYSTEM AND METHOD FOR TESTING MULTIPLE DATA PACKET SIGNAL TRANSCEIVERS

BACKGROUND

The present invention relates to testing data packet transceivers, and in particular, to testing multiple data packet signal transceivers simultaneously.

Many of today's electronic devices use wireless technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless technologies must adhere to various wireless technology standard specifications.

When deciding such wireless devices, engineers take extra care to ensure that such devices will meet or exceed each of their included wireless technology prescribed standard-based specifications. Furthermore, when these devices are later being manufactured in quantity, they are tested to ensure that manufacturing defects will not cause improper operation, including their adherence to the included wireless technology standard-based specifications.

For testing these devices following their manufacture and assembly, current wireless device test systems employ a subsystem for analyzing signals received from each device. Such subsystems typically include at least a vector signal generator (VSG) for providing the source signals to be transmitted to the device under test, and a vector signal analyzer (VSA) for analyzing signals produced by the device under test. The production of test signals by the VSG and signal analysis performed by the VSA are generally programmable so as to allow each to be used for testing a variety of devices for adherence to a variety of wireless technology standards with differing frequency ranges, bandwidths and signal modulation characteristics.

As part of the manufacturing of wireless communication devices, one significant component of production cost is costs associated with manufacturing tests. Typically, there is a direct correlation between the cost of test and the time required to perform the test. Thus, innovations that can shorten test time without compromising test accuracy or increasing Equipment costs (e.g., increasing costs due to increasing sophistication of necessary test equipment, or testers) are important and can provide significant costs savings, particularly in view of the large numbers of such devices being manufactured and tested.

A recent development in the design and operation of wireless radio frequency (RF) data packet signal transceivers has been the use of multiple inputs and multiple outputs implemented with multiple antennas. In other words, such devices, referred to as multiple-input, multiple-output (MIMO) devices, use multiple antennas for wireless transmission and reception of their data packet signals. Accordingly, when testing such devices provisions are made for testing them in such a way as to exercise their MIMO capabilities. For example, this includes operating the device under test (DUT) such that all of its transmitters and receivers are operating to transmit and receive, respectively, their respective data packet streams via their respective antenna connections. Hence, all transmitters and all receivers can be tested simultaneously.

However, for single-input, single-output (SISO) data packet signal transceivers, such devices require sophisticated dedicated testing hardware to accomplish such simultaneous testing of multiple DUTs, or, alternatively, time consuming sequential testing to avoid higher capital costs associated with such sophisticated test equipment.

Accordingly, it would desirable to have a technique for testing multiple SISO devices more quickly than by purely sequential testing, and while avoiding the need for sophisticated dedicated test equipment.

SUMMARY

In accordance with the presently claimed invention, a system and method are provided for using a N×N multiple input, multiple output (MIMO) data packet signal transceiver for testing multiple data packet signal transceivers. In accordance with one exemplary embodiment, a N×N MIMO access point can be used for simultaneous testing of multiple single input, single output (SISO) data packet signal transceivers. Selective data packet signal corruption (e.g., in the form of data packet signal attenuation), allows for individual testing of the transmit signals from respective ones of the data packet signal transceivers.

In accordance with one embodiment of the presently claimed invention, a system with a N×N multiple input, multiple output (MIMO) data packet signal transceiver for testing a plurality of data packet signal transceivers includes:

a plurality of N signal paths for communicating with a plurality of data packet signal transceiver devices under test (DUTs) to convey a plurality of N transmit data packet signals from said plurality of DUTs and to convey a plurality of N receive data packet signals to said plurality of DUTs;

a N×N MIMO data packet signal transceiver to receive at least a portion of said plurality of N transmit data packet signals and provide said plurality of N receive data packet signals; and signal control circuitry coupled between said N×N MIMO data packet signal transceiver and said plurality of N signal paths, and responsive to said plurality of N transmit data packet signals by corrupting at least a portion of each of one or more of said plurality of N transmit data packet signals received with said N×N MIMO data packet signal transceiver.

In accordance with another embodiment of the presently claimed invention, a method of testing a plurality of single input, single output (SISO) data packet signal transceivers with a N×N multiple input, multiple output (MIMO) data packet signal transceiver includes:

providing a plurality of N signal paths for communicating with a plurality of data packet signal transceiver devices under test (DUTs) to convey a plurality of N transmit data packet signals from said plurality of DUTs and to convey a plurality of N receive data packet signals to said plurality of DUTs;

receiving, with a N×N MIMO data packet signal transceiver, at least a portion of said plurality of N transmit data packet signals;

providing, with said N×N MIMO data packet signal transceiver, said plurality of N receive data packet signals; and responding to said plurality of N transmit data packet signals by corrupting at least a portion of each of one or more of said plurality of N transmit data packet signals received with said N×N MIMO data packet signal transceiver.

DETAILED DESCRIPTION

Figure 1:
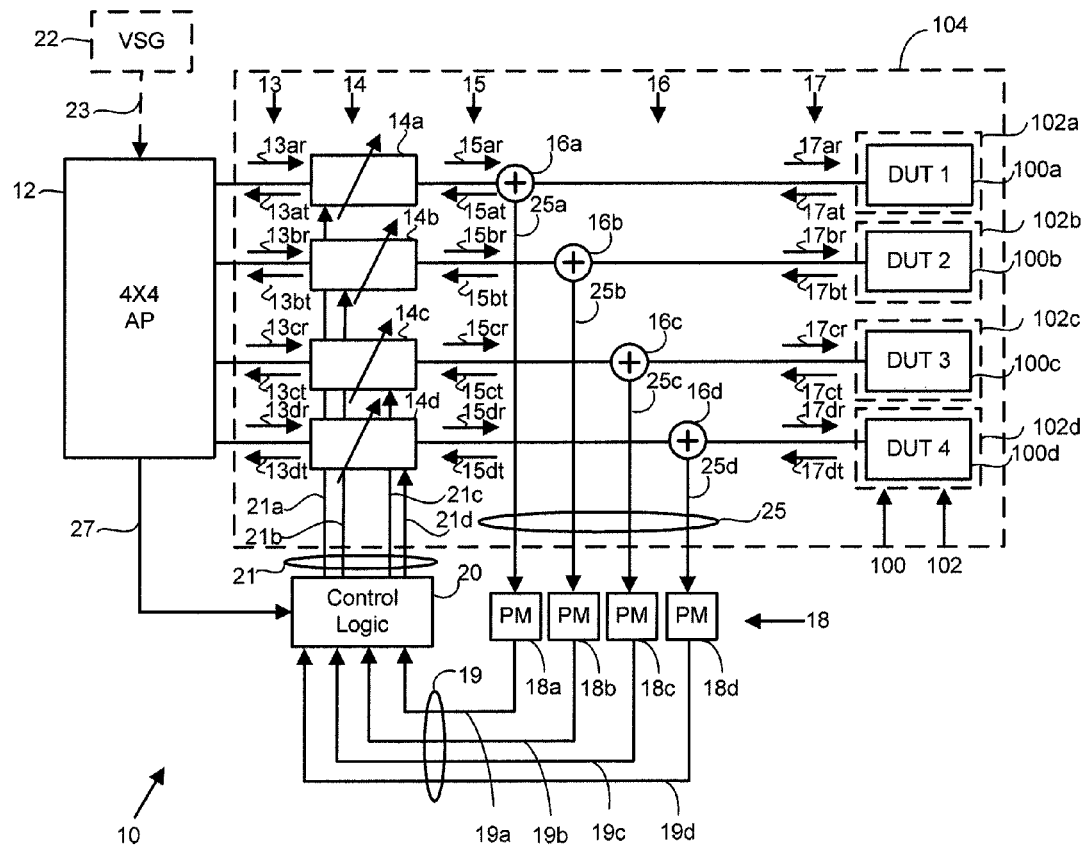
FIG. 1 depicts a testing environment for testing multiple data packet signal transceivers in accordance with an exemplary embodiment of the presently claimed invention.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

As discussed below, in accordance with exemplary embodiments of the presently claimed invention, a N×N MIMO data packet signal transceiver, such as a N×N MIMO access point (AP), is used for testing multiple data packet signal transceivers, such as multiple SISO data packet signal transceiver devices under test (DUTs), using signal paths, such as conductive RF signal paths (e.g., coaxial cables and connectors), for conveying signals between each SISO DUT and its respective signal port on the MIMO AP. The signal paths include means for controlling, e.g., varying, signal path loss or attenuation, means for detecting data packet signal envelope power, and means for controlling the variable signal path loss, among other elements as will be described. (While the following discussion is in the context of a single-user MIMO AP communicating with multiple SISO DUTs, it will be understood by one of ordinary skill in the art that the techniques described can also be applied in a testing environment involving a multiple-user MIMO AP communicating with multiple MIMO DUTs or multiple SISO DUTs.)

In accordance with further exemplary embodiments, one or more data packet signal analysis devices, such as one or more VSAs, can be included to allow for analysis of the data packet signals (e.g., analysis of physical layer data packet signal characteristics).

In accordance with exemplary embodiments for transmit signal testing of the DUTs, selective data packet signal corruption, e.g., increases in data packet signal path loss, is used. Accordingly, despite the existence of signal path links between all SISO DUTs and the MIMO AP, the MIMO AP is allowed to operate with awareness of, and, therefore, communication with, only one SISO DUT. Accordingly, during transmit testing, the MIMO AP behaves as if it is linked and communicating with a single SISO DUT. Meanwhile, however, all SISO DUTs are responding, e.g., with ping signal responses. These responses are being corrupted (e.g., attenuated) before they are actually received by the MIMO AP, but after they have been otherwise detected and measured, e.g., detected for signal envelope power or analyzed for EVM (error vector magnitude) characteristics. Accordingly, all SISO DUTs can be effectively tested simultaneously for transmit signal power and physical layer data packet signal characteristics.

Similarly, during received signal testing, data packets are sent by MIMO AP to the SISO DUTs, but confirmation data packets coming back from the SISO DUTs to the MIMO AP are selectively corrupted such that, again, the MIMO AP is aware of only communicating with a signal SISO DUT. As before, however, such confirmation data packets, prior to corruption, are detected and counted, e.g., by data packet signal envelope power detectors. Accordingly, as before, all SISO DUTs can be effectively tested in parallel.

Referring to FIG. 1, a testing environment 10 for employing test systems and methods in accordance with exemplary embodiments of the presently claimed invention include a N×N MIMO AP 12 and corresponding numbers N of signal conditioning circuits 14, signal dividers (or splitters or couplers) 16, and power measurement circuits 18, plus control circuitry (or logic) 20, for testing a corresponding number N of DUTs 100. As desired, the DUTs may be individually isolated by respective shielded enclosures 102 and further contained, along with the signal paths formed by the signal conditioning circuits 14 and signal dividers 16, within another shielded enclosure 104. Additionally, a VSG 22 can be included to provide one or more source signals 23 for use by the MIMO AP 12 in providing receive data signals for the DUTs 100.

For purposes of the examples herein, the N×N system is a 4×4 system in which a 4×4 MIMO AP is used along with four signal paths including four signal conditioning circuits 14 and signal dividers 16 for testing four DUTs 100. However, it will be readily understood by one skilled in the art that such system can be scaled higher or lower in terms of the number of MIMO signal ports and signal paths.

The MIMO AP 12 and DUTs 100 communicate via signal paths 13, 15, 17, which, in turn, provide signal communications between the MIMO AP 12, signal conditioning circuits 14, signal dividers 16 and DUTs 100, in accordance with well-known techniques (e.g., using RF signal cables and connectors). The MIMO AP 12 provides receive data packet signals 13*ar*, 13*br*, 13*cr*, 13*dr* to the signal conditioning circuits 14, which convey the signals in substantially non-corrupted form 15*ar*, 15*br*, 15*cr*, 15*dr* to the signal dividers 16 for further conveyance 17*ar*, 17*br*, 17*cr*, 17*dr* to the DUTs 100 (preferably with little or no signal dividing imparted in this signal direction).

Similarly, the DUTs 100*a*, 100*b*, 100*c*, 100*d* provide respective transmit data packet signals 17 at, 17*bt*, 17*ct*, 17*dt* to the signal dividers 16*a*, 16*b*, 16*c*, 16*d*. The signals are divided into incident transmit data packet signals 15 at, 15bt, 15ct, 15dt for the signal conditioning circuits 14a, 14b, 14c, 14d, and replica (or sample) data packet signals 25a, 25b, 25c, 25d for measurement by the power measurement circuits 18a, 18b, 18c, 18d. The power measurement circuits 18 detect the signal envelope power of the respective replica signals 25 and provide power measurement signals 19 indicative of one or more of the respective magnitudes, start times and end times of each of the replica data packet signals 25a, 25b, 25c, 25d. These data signals 19a, 19b, 19c, 19d are processed by the control logic 20 to provide control signals 21 for the signal conditioning circuits 14.

In accordance with the control signals 21, the signal conditioning circuits 14a, 14b, 14c, 14d selectively corrupt one more (preferably all but one) of the incident transmit data packet signals 15 at, 15bt, 15ct, 15dt (discussed in more detailed below). The resulting corrupted and non-corrupted transmit data packet signals 13 at, 13bt, 13ct, 13dt are conveyed to the MIMO AP 12.

When the MIMO AP 12 provides the receive data packet signals 13ar, 13br, 13cr, 13dr, it also provides one or more control signals 27 indicative of one or more of the start time and end time of each of such signals 13ar, 13br, 13cr, 13dr. This allows the control logic 20 to ensure that its control signals 21 cause the signal conditioning circuits 14 to convey the receive data packet signals to the signal dividers 16 in a substantially non-corrupted manner (e.g., with minimal, if any, signal attenuation).

Figure 2:
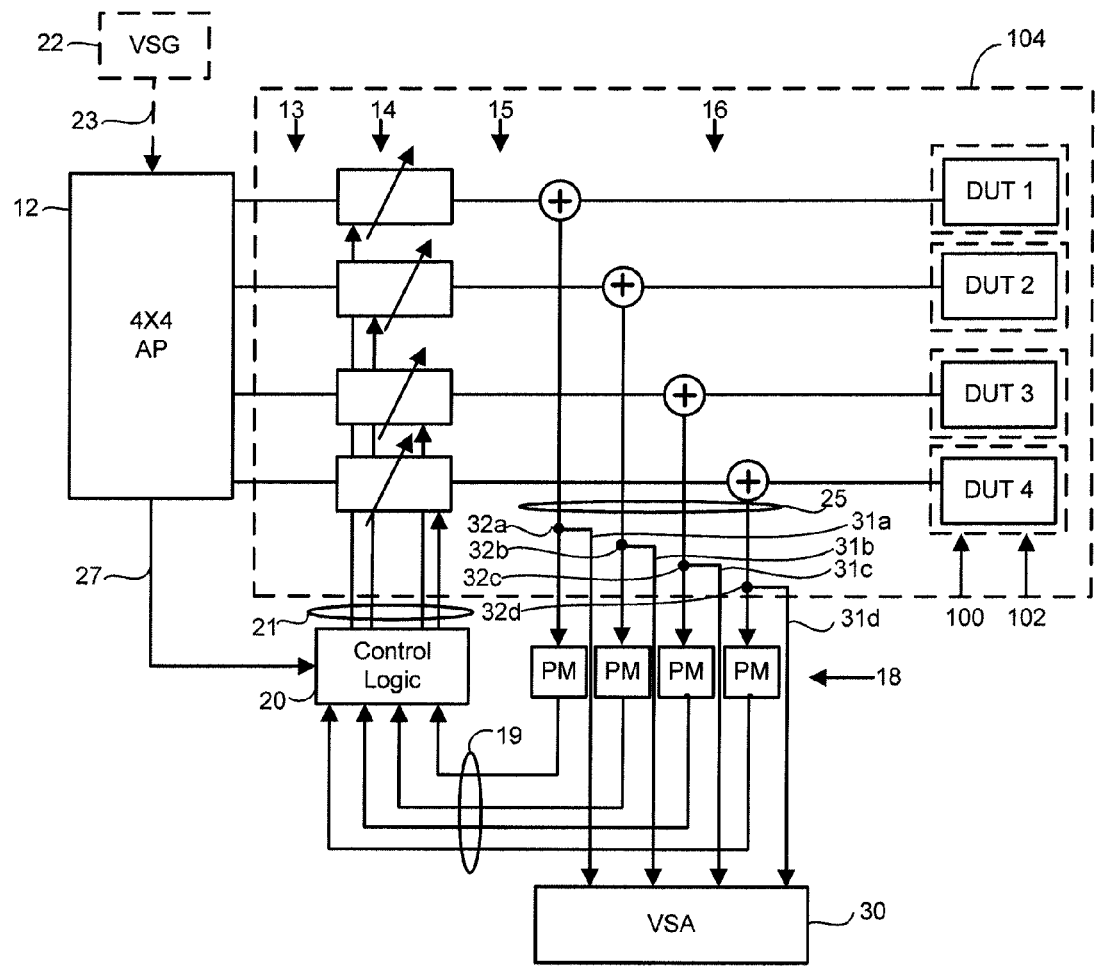
FIG. 2 depicts a testing environment for testing multiple data packet signal transceivers in accordance with another exemplary embodiment of the presently claimed invention.

Referring to FIG. 2, in accordance with further exemplary embodiments, one or more VSAs 30 can be included to analyze various signal characteristics of the replica data packet signals 25. Additional signal dividers 32a, 32b, 32c, 32d can be included to further divide the replica transmit data packet signals 25 to provide sufficiently isolated replica transmit data packet signals 31a, 31b, 31c, 31d for processing by the VSA(s) 30. Further, as another alternative, the VSG 22 can also be connected (e.g., via signal switching or coupling circuitry) to the main signal dividers 16 or to the additional signal dividers 32a, 32b, 32c, 32d (which will serve as signal combiners or couplers in the VG signal direction) for providing receive data signals for the DUTs 100.

As discussed in more detail below, the signal conditioning circuits 14, in accordance with their respective control signals 21, vary the signal path loss to a level at which sufficient data packet signal attenuation occurs such that the attenuated data packet signal cannot be received without errors by the MIMO AP 12. Such data packet signal attenuation preferably begins at the end of a training sequence but before the data payload within the data packet signal. This will confirm that the corresponding MIMO AP 12 receive channel has begun receiving the signal and its automatic gain control (AGC) circuitry (not shown) has settled and established the data packet signal gain during such signal attenuation, thereby ensuring that the AGC will not further adjust and erroneously cause the channel receive other port/channel signals via unknown or undesired leakage signal paths. Meanwhile, during this time that the MIMO AP 12 is effectively communicating with only one DUT 100, the power measurement circuits 18, which are upstream of the signal conditioning circuits 14 (with respect to the DUT transmit signals), can still perform power measurements on the transmit data packet signals with no data packet corruption.

Figure 3:
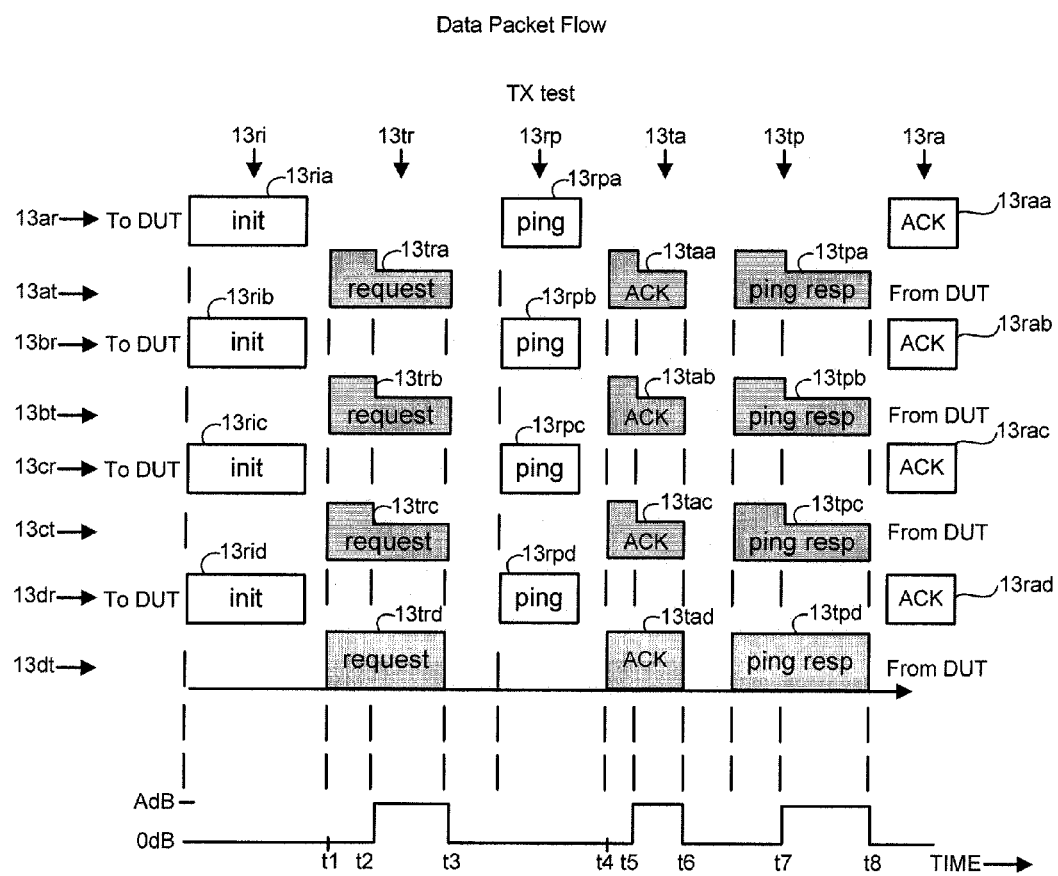
FIG. 3 depicts a signal timing diagram for transmit signal tests of multiple data packet signal transceivers in accordance with an exemplary embodiment of the presently claimed invention.

Referring to FIG. 3, during transmit signal testing, the MIMO AP 12 provides initiation data packets 13ri to initiate communication links with the respective DUTs 100. In response to these initiation data packets 13ri, the DUTs 100 transmit request data packets 13tr to establish respective communication links with the MIMO AP 12. As discussed above, the power measurement circuits 18 detect the DUT transmit signals 13tr (e.g., their one or more of their start time t1, end time t3 and data packet duration t341), following which the control logic 20 provides appropriate control signals 21 such that all 13tra, 13trb, 13trc but one 13trd transmit data packet signal is corrupted (e.g., at a time t2 subsequent to the data packet start time t1 to ensure a receive path with settled AGC), thereby ensuring that only one of the MIMO AP 12 signal ports is communicating with one DUT 100. Communication continues, e.g., with the MIMO AP 12 following up with ping data packets from all N ports, with confirmation data packets 13ta and ping response data packets 13tp provided by the DUTs 100, with corresponding data packets corrupted so as to maintain the initially established communication link between one MIMO AP 12 signal port and its corresponding DUT 100d.

Figure 4:
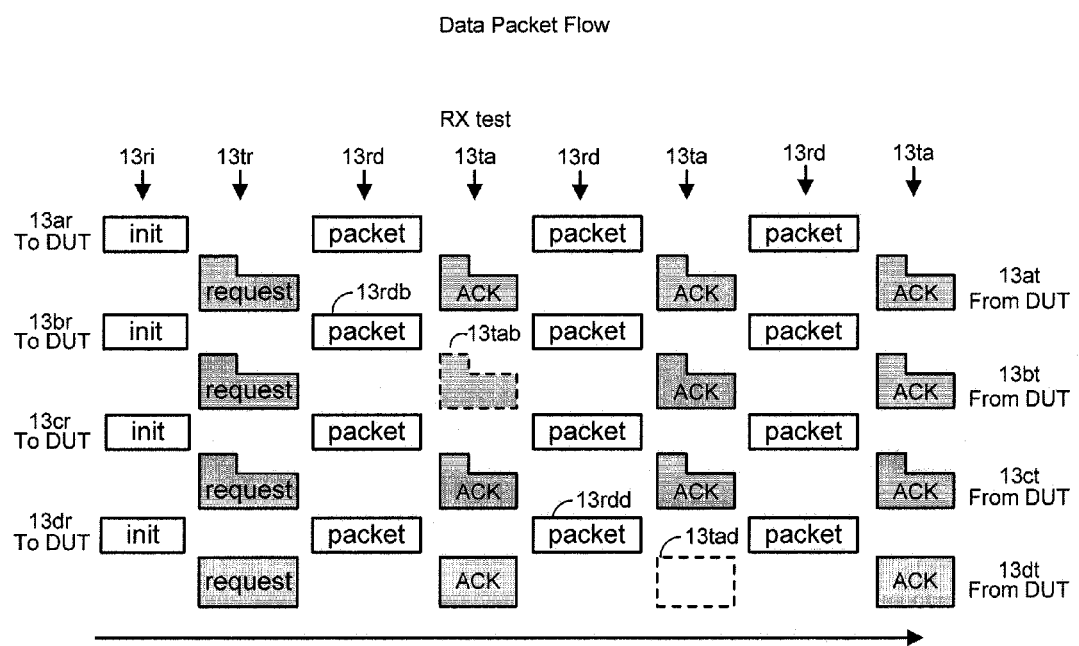
FIG. 4 depicts a signal timing diagram for receive signal tests of multiple data packet signal transceivers in accordance with another exemplary embodiment of the presently claimed invention.

Referring to FIG. 4, similarly, during receive signal testing, data packets 13tr, 13ta transmitted by the DUTs 100 are selectively corrupted to ensure establishment of a signal communication link between one signal port of the MIMO AP 12 and its corresponding DUT 100d. Even in those instances where a data packet 13rdb, 13rdd is transmitted by the MIMO AP 12 but not received by its corresponding DUT 100b, 100d, and, therefore, not confirmed by a corresponding acknowledgement (ACK) data packet 13tab, 13tad, the existence of such data packets 13rdb, 13rdd can nonetheless be confirmed by data packet counting using the power measurement circuits 18, since such data packets 13rdb, 13rdd can be detected by the power measurements circuits 18 notwithstanding their faulty reception by their respective DUTs 100b, 100d. Accordingly, receive signal testing can be performed simultaneously for all N DUTs 100. Further, using the VSA(s) 30 (FIG. 2), the data packets sent from the MIMO AP 12 to the DUTs 100 that were not properly received (i.e., evoked no corresponding acknowledgement data packets 13tab, 13tad) can still be captured and analyzed to determine if such data packets 13rdb, 13rdd were faulty or if the corresponding DUTs 100b, 100d somehow failed to receive, detect, or respond to what were, in fact, good data packets.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a system with a N×N multiple input, multiple output (MIMO) data packet signal transceiver for testing a plurality of data packet signal transceivers, comprising:

a plurality of N signal paths for communicating with a plurality of data packet signal transceiver devices under test (DUTs) to convey a plurality of N transmit data packet signals from said plurality of DUTs and to convey a plurality of N receive data packet signals to said plurality of DUTs;

a N×N MIMO data packet signal transceiver to receive at least a portion of said plurality of N transmit data packet signals and provide said plurality of N receive data packet signals; and signal control circuitry coupled between said N×N MIMO data packet signal transceiver and said plurality of N signal paths, and responsive to said plurality of N transmit data packet signals by corrupting at least a portion of each of one or more of said plurality of N transmit data packet signals received with said N×N MIMO data packet signal transceiver.

2. The apparatus of claim 1, wherein said plurality of N signal paths comprises a plurality of N conductive radio frequency (RF) signal paths.

3. The apparatus of claim 1, wherein each one of at least a portion of said plurality of DUTs comprises a single input, single output (SISO) DUT.

4. The apparatus of claim 1, wherein said N×N MIMO data packet signal transceiver comprises a multi-user N×N MIMO data packet signal transceiver.

5. The apparatus of claim 1, wherein said N×N MIMO data packet signal transceiver comprises a N×N MIMO access point.

6. The apparatus of claim 1, wherein said N×N MIMO data packet signal transceiver is to receive said at least a portion of said plurality of N transmit data packet signals simultaneously and provide said plurality of N receive data packet signals simultaneously.

7. The apparatus of claim 1, wherein said signal control circuitry is further responsive to one or more control signals from said N×N MIMO data packet signal transceiver by conveying said plurality of N receive data packet signals in a substantially non-corruptive manner.

8. The apparatus of claim 1, wherein said signal control circuitry comprises:
  signal measurement circuitry responsive to said plurality of N transmit data packet signals by providing one or more first control signals; and
  signal conditioning circuitry coupled to said signal measurement circuitry and responsive to said one or more first control signals by corrupting said at least a portion of each of one or more of said plurality of N transmit data packet signals received with said N×N MIMO data packet signal transceiver.

9. The apparatus of claim 7, wherein said one or more control signals are indicative of at least a start time of each of said plurality of N receive data packet signals.

10. The apparatus of claim 8, wherein said one or more first control signals are indicative of at least one of a magnitude, a start time and an end time of each of said plurality of N transmit data packet signals.

11. The apparatus of claim 8, wherein said signal conditioning circuitry is further responsive to one or more second control signals from said N×N MIMO data packet signal transceiver by conveying said plurality of N receive data packet signals in a substantially non-corruptive manner.

12. A method of testing a plurality of single input, single output (SISO) data packet signal transceivers with a N×N multiple input, multiple output (MIMO) data packet signal transceiver, comprising:
  providing a plurality of N signal paths for communicating with a plurality of data packet signal transceiver devices under test (DUTs) to convey a plurality of N transmit data packet signals from said plurality of DUTs and to convey a plurality of N receive data packet signals to said plurality of DUTs;
  receiving, with a N×N MIMO data packet signal transceiver, at least a portion of said plurality of N transmit data packet signals;
  providing, with said N×N MIMO data packet signal transceiver, said plurality of N receive data packet signals; and
  responding to said plurality of N transmit data packet signals by corrupting at least a portion of each of one or more of said plurality of N transmit data packet signals received with said N×N MIMO data packet signal transceiver.

13. The method of claim 12, wherein said providing a plurality of N signal paths comprises providing a plurality of N conductive radio frequency (RF) signal paths.

14. The method of claim 12, wherein each one of at least a portion of said plurality of DUTs comprises a single input, single output (SISO) DUT.

15. The method of claim 12, wherein said N×N MIMO data packet signal transceiver comprises a multi-user N×N MIMO data packet signal transceiver.

16. The method of claim 12, wherein said N×N MIMO data packet signal transceiver comprises a N×N MIMO access point.

17. The method of claim 12, wherein:
  said receiving, with a N×N MIMO data packet signal transceiver, at least a portion of said plurality of N transmit data packet signals comprises receiving said at least a portion of said plurality of N transmit data packet signals simultaneously; and
  said providing, with said N×N MIMO data packet signal transceiver, said plurality of N receive data packet signals comprises providing said plurality of N receive data packet signals simultaneously.

18. The method of claim 12, further comprising responding to one or more control signals from said N×N MIMO data packet signal transceiver by providing said plurality of N receive data packet signals to said plurality of DUTs in a substantially non-corruptive manner.

19. The method of claim 12, wherein said responding to said plurality of N transmit data packet signals by corrupting at least a portion of each of one or more of said plurality of N transmit data packet signals received with said N×N MIMO data packet signal transceiver comprises:
  measuring at least one signal characteristic of each of said plurality of N transmit data packet signals and responsive thereto providing one or more first control signals; and
  responding to said one or more first control signals by corrupting said at least a portion of each of one or more of said plurality of N transmit data packet signals received with said N×N MIMO data packet signal transceiver.

20. The method of claim 19, wherein said one or more first control signals are indicative of at least one of a magnitude, a start time and an end time of each of said plurality of N transmit data packet signals.

* * * * *

UNITED STATES PATENT AND TRADEMARK OFFICE
CERTIFICATE OF CORRECTION

PATENT NO. : 8,879,659 B1  
APPLICATION NO. : 14/017012  
DATED : November 4, 2014  
INVENTOR(S) : Christian Volf Olgaard Page 1 of 1

It is certified that error appears in the above-identified patent and that said Letters Patent is hereby corrected as shown below:

In the Specification:

Column 6, Line 4 should read:

"t1, end time t3 and data packet duration t3-t1), following"

Signed and Sealed this
Seventeenth Day of February, 2015

Michelle K. Lee
*Deputy Director of the United States Patent and Trademark Office*